United States Patent [19]
Berglund

[11] Patent Number: 5,271,752
[45] Date of Patent: Dec. 21, 1993

[54] DEVICE FOR MOUNTING FILTER BAGS IN A FILTERING CHAMBER

[75] Inventor: Svante Berglund, Wieselgrensgatan, Fed. Rep. of Germany

[73] Assignee: ABB Fläkt AB, Nacka, Sweden

[21] Appl. No.: 960,465

[22] PCT Filed: Jun. 20, 1991

[86] PCT No.: PCT/SE91/00444
§ 371 Date: Dec. 16, 1992
§ 102(e) Date: Dec. 16, 1992

[87] PCT Pub. No.: WO91/19557
PCT Pub. Date: Dec. 26, 1991

[30] Foreign Application Priority Data
Jun. 21, 1990 [SE] Sweden .............. 9002221-1

[51] Int. Cl.⁵ ............................................. B01D 46/04
[52] U.S. Cl. ....................................... 55/302; 55/341.1
[58] Field of Search ............................ 55/302, 341.1

[56] References Cited
U.S. PATENT DOCUMENTS
3,535,851 10/1970 Riemsloh ............... 55/341.1 X
3,733,784 5/1973 Anderson et al. ...... 55/341.1 X FOREIGN PATENT DOCUMENTS
358094 7/1973 Sweden .
414454 8/1980 Sweden .
660982 6/1987 Sweden .

Primary Examiner—Charles Hart
Attorney, Agent, or Firm—Burns, Doane, Swecker & Mathis

[57] ABSTRACT

A device for mounting vertical bag-shaped filter elements (15) in a filtering chamber in a filtering installation for cleaning contaminated gases which are conducted into the filtering chamber to be filtered by the bag-shaped filter elements and conducted, via the bag openings, to a chamber for clean gas which is located above and separate from the filtering chamber and from which the gases are discharged from the filtering installation, comprises a horizontal, lower tubular element (1) and a horizontal, upper tubular element (4) which extends along the lower tubular element (1) to which it is connected. The lower tubular element (1) forms a clean-gas chamber and has a series of first through holes (10) in its lower tube-wall portion (2b). The bag-shaped filter elements (15) can be mounted on the lower tubular element (1) with the bag openings opposite to the first holes (10). The upper tubular element (4) is closed at one end, and its interior communicates with that of the lower tubular element (1) via a series of second holes (11), each of which is vertically aligned with one of the first holes (10). The upper tubular element (4) is adapted, at the other end, to be connected to a pressure source via a regulating valve for producing pressure pulses to clean the bag-shaped filter elements (15).

8 Claims, 1 Drawing Sheet

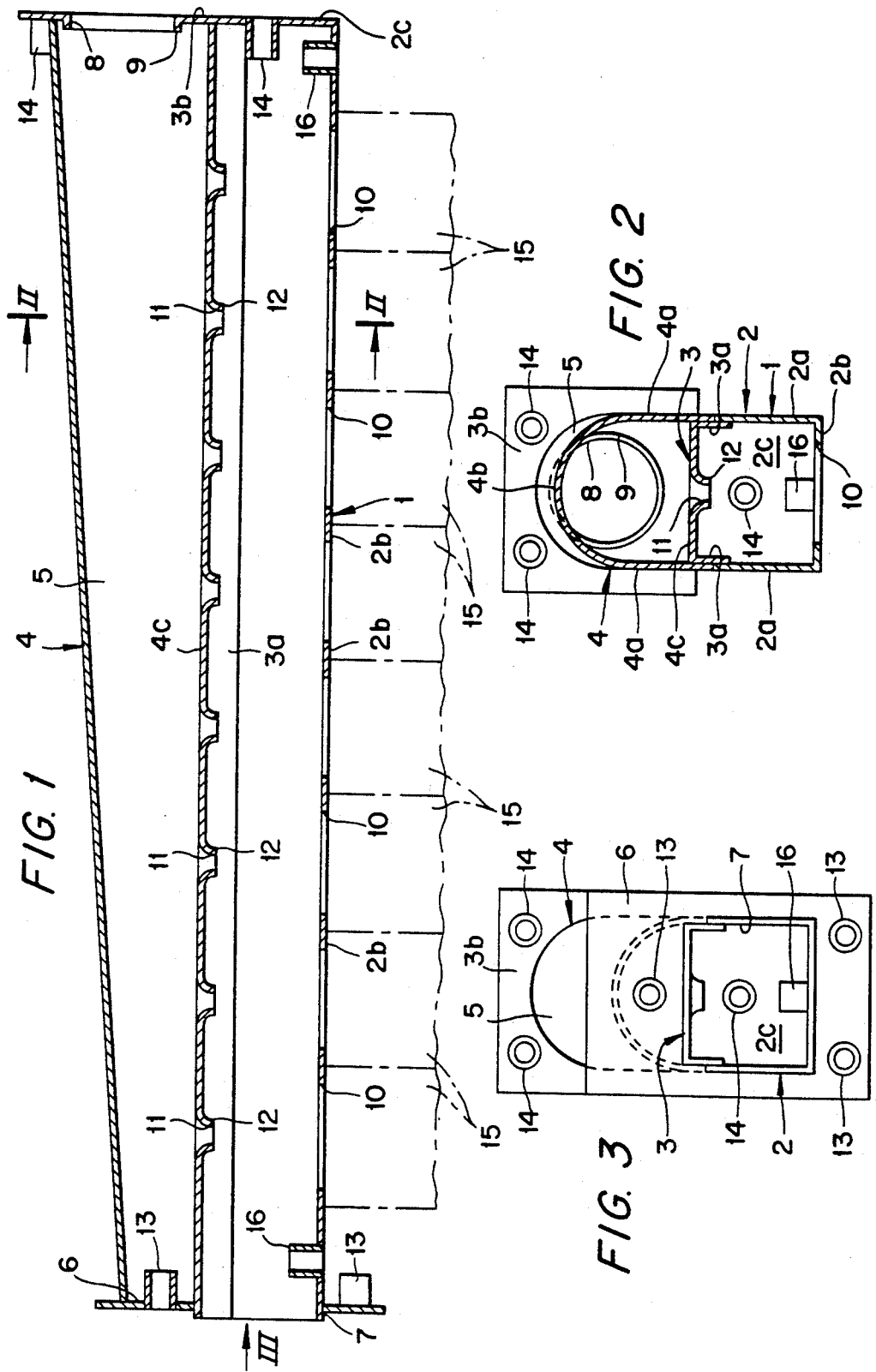

DEVICE FOR MOUNTING FILTER BAGS IN A FILTERING CHAMBER

This invention bears upon a device for mounting substantially vertical bag-shaped filter elements in a filtering chamber in a filtering installation for cleaning contaminated gases which are conducted into said filtering chamber to be filtered by the bag-shaped filter elements and conducted, via the bag openings, to a chamber for clean gas which is located above and separate from said filtering chamber and from which the gases are discharged from the filtering installation.

In conventional filtering installations, the filtering chamber or raw-gas chamber is separated from the superior clean-gas chamber by means of a horizontal metal sheet. The bag-shaped filter elements are suspended from the sheet, the bag openings being closely applied against the underside thereof. Further, the metal sheet is formed with a plurality of rows of through holes, each of which is located opposite to a bag opening. The contaminated gases are conducted into the filtering chamber and pass through the filter-bag walls, so that dust contained in the contaminated gases is filtered off and adheres to the walls. The filtered gases are thereafter conducted up through the bag-shaped filter elements and, via the bag openings and the metal-sheet holes, into the clean-gas chamber whence they are discharged from the installation.

A plurality of tubes, which are equipped with nozzles in the same spaced-apart relationship as the holes in each row in the metal sheet, are mounted at a distance above the sheet. Each tube is so mounted along a row of holes that the nozzles are vertically aligned with the holes, and consequently with the corresponding bag openings. The nozzle tubes are connected to a pressure tank via a control valve device adapted to impart brief pressure pulses to said tubes and their nozzles in order to clean the bag-shaped filter elements. The pressure pulses knock the dust from the filter-bag walls, and the thus-released dust then drops into hoppers arranged underneath the bag-shaped filter elements.

Theoretically, this mounting of the nozzle tubes should be the optimal one, the nozzles and the sheet holes being vertically aligned with one another. In actual practice, however, such optimal mounting is extremely difficult to achieve, not only owing to manufacturing tolerances resulting in a spaced-apart relationship of the nozzles which is different from that of the sheet holes and in a slightly offset nozzle arrangement, but also because it is extremely difficult to mount the nozzle tubes in exact positions along the rows of holes in the metal sheet mounted in the filtering installation. In actual practice, the nozzles are therefore frequently slightly offset in relation to the holes in the metal sheet. This reduces the effect of the pressure pulses, and at least some bag-shaped filter elements are not properly cleaned. It goes without saying that this impairs the cleaning capacity of the filtering installation.

The above-described conventional installations are so designed that the contaminated gases are conducted into the filtering chamber on a level with the lower portion of the bag-shaped filter elements, resulting in upwardly-directed gas flows also outside the bag-shaped filter elements. These gas flows make it more difficult for the dust released from the filter-bag walls by the pressure pulses to drop into the hoppers. Thus, some of the released dust remains suspended in the spaces between the bag-shaped filter elements, and may again adhere to the filter-bag walls. Naturally, this also impairs the cleaning capacity of the filtering installation.

The object of the present invention is to provide a device for mounting bag-shaped filter elements in a filtering chamber, said device being designed to obviate the above capacity-reducing drawbacks.

According to the invention, this object is achieved by a device which is of the type described in the introduction to this specification and which is characterised by a substantially horizontal, lower tubular element which forms a clean-gas chamber and has a series of first through holes in its lower tube-wall portion and on which the bag-shaped filter elements are mountable with the bag openings opposite to said first holes, and by a substantially horizontal, upper tubular element which is closed at one end and which extends along said lower tubular element and is connected thereto, and whose interior communicates with that of said lower tubular element via a series of second holes, each of which is vertically aligned with one of said first holes, said upper tubular element being adapted, at the other end, to be connected to a pressure source via a regulating valve for producing pressure pulses to clean said bag-shaped filter elements.

In a preferred embodiment, the cross-sectional area of said upper tubular element decreases in the direction of said one end.

Each of the second holes is preferably surrounded by a collar extending down into said lower tubular element.

In a preferred embodiment, the lower tubular element has a substantially square cross-sectional shape.

A preferred embodiment of the invention will now be described in more detail below, reference being had to the accompanying drawing, in which FIG. 1 is a longitudinal section of a device according to the invention, FIG. 2 is a cross-section taken along line II—II in FIG. 1 of said device, and FIG. 3 is an end view showing said device in the direction indicated by the arrow III in FIG. 1.

The device shown in the drawing is adapted to be mounted horizontally in a filtering chamber in a cartridge filter installation. The words "horizontal", "vertical", "upper" and "lower", as used in the following description and in the appended claims and the abstract, therefore refer to the position of the device when mounted.

The device shown has a horizontal, lower tubular element 1 which forms a clean-gas chamber of substantially square cross-section. The lower tubular element 1 is composed of a lower metal sheet 2 bent into U-shape, and an upside-down upper metal sheet 3 also bent into U-shape, whose side members 3a are welded to the insides of the side members 2a of the lower metal sheet 2 (see FIGS. 2 and 3). The bottom member 2b of the lower metal sheet 2 has an extension piece 2c which is bent upwards and welded to the right end of the two metal sheets 2 and 3 (as seen in FIG. 1) to close the lower tubular element 1 at this end.

The device further comprises a horizontal, upper tubular element 4 forming a cleaning-gas duct and extending along the lower tubular element 1. The upper tubular element 4 is made up of an upside-down metal sheet 5 bent into U-shape and forming the side walls 4a and the upper wall 4b of the tubular element 4, as well as the metal sheet 3 whose web portion forms the bottom wall 4c of the tubular element 4. The side walls 4a are vertical, and have the same spaced-apart relationship as the side members 2a of the metal sheet 2. The side walls 4a are welded to the outsides of the side members 3a of the metal sheet 3 and vertically aligned with the side members 2a of the metal sheet 2 (see FIG. 2). The side walls 4a are interconnected by the upper wall 4b, which is arcuate.

The height of the upper tubular element 4 decreases from the right end (as seen in FIG. 1), where the lower tubular element 1, as mentioned earlier, is closed by means of the extension piece 2c, to the left end (as seen in FIG. 1), where the upper tubular element 4 is closed by means of a rectangular metal sheet 6. Further, the metal sheet 6 is formed with a substantially square hole 7 whose shape corresponds to the cross-sectional shape of the lower tubular element 1 and through which extends the left end portion (as seen in FIG. 1) of the lower tubular element 1. The metal sheet 6 is applied against the left end of the upper tubular element 4 (as seen in FIG. 1) and is welded to both the lower tubular element 1 and the upper tubular element 4.

The metal sheet 3 has an extension piece 3b which is bent upwards and welded to the right end of the metal sheet 5 (as seen in FIG. 1) as well as to the upper portion of the extension piece 2c. The upwardly-bent extension piece 3b projects some distance above and beside the upper tubular element 4. Further, the upwardly-bent extension piece 3b is formed with a circular through hole 8 which is surrounded by a collar 9 extending into the upper tubular element 4.

The lower tubular element 1 is formed with eight circular through holes 10 in the bottom member 2b. The holes 10 are evenly distributed along the longitudinal centre line of the tubular element 1.

The upper tubular element 4 is formed with eight circular through holes 11 in its bottom wall 4c. Each hole 11 is surrounded by a collar 12 extending down into the lower tubular element 1, and is vertically aligned with one of the holes 10 in the bottom member 2b.

As mentioned earlier, the device is designed to be mounted in horizontal position in a cartridge filter installation (not shown), and therefore has a plurality of rivet nuts 13 and 14. Three rivet nuts 13 are fixed in the metal end sheet 6, two rivet nuts 14 are fixed in the upwardly-bent extension piece 3b, and one rivet nut 14 is fixed in the upwardly-bent extension piece 2c.

A plurality of devices according to the invention are mounted in parallel and spaced-apart relationship in the upper part of the filtering chamber of the installation. The devices are fastened by screws which are screwed into the rivet nuts 13 and 14. All holes are directly and properly aligned because the device according to the invention is in itself a prefabricated unit in which the holes 11 already are vertically aligned with the holes 10.

A cartridge filter consisting of a plurality of vertical bag-shaped filter elements 15 (eight in the embodiment shown) disposed in a row after one another, is suspended from the bottom member 2b of the lower tubular element 1 of each device. Two rivet nuts 16 are, for this purpose, fixed in the bottom member 2b. The cartridge filter is fixed by screws which are screwed into the rivet nuts 16. The bag-shaped filter elements 15 are thus closely applied against the underside of the bottom member 2b, each bag opening being located opposite to a pair of holes, 10-11. Naturally, separate filter bags can be used instead of a cartridge filter, in which case the filter bags may be mounted in the holes 10 in such a manner that their openings project into the lower tubular element 1 and are fixed to the upper side of the bottom member 2c.

The upper tubular element 4 of each device is, at the right end in FIG. 1, connected to a compressed-air tank via a regulating valve device for producing compressed-air pulses to clean the bag-shaped filter elements 15. Thus, the compressed-air pulses are imparted to the upper tubular element 4 via the hole 8 in the upwardly-bent extension piece 3b.

The contaminated gases to be cleaned are conducted into the upper part of the filtering chamber, i.e. directly above the devices according to the invention. The contaminated gases are introduced in a direction transverse of the tubular elements 1 and 4, and are then conducted down between the cartridge filters to pass through the walls of the bag-shaped filter elements 15, said walls filtering off the dust contained in the gases. Then, the filtered gases are conducted up through the bag-shaped filter elements 15 and, via the bag openings and the holes 10, into the separate clean-gas chambers, i.e. the lower tubular element 1, whence they are discharged via the open end to the left in FIG. 1. At their open end, the lower tubular elements 1 of the devices end in a common duct which extends transversely of the tubular elements 1 and 4 and from which the cleaned gases leave the installation.

When the bag-shaped filter elements 15 are to be cleaned, the regulating valve device imparts compressed-air pulses to the upper tubular elements 4. Owing to the decreasing height, and consequently decreasing cross-sectional area, of the upper tubular elements 4, the velocity of the compressed-air flow can be kept constant or substantially constant along the entire length of the tubular elements. The compressed-air pulses reach the interiors of the bag-shaped filter elements 15 via the vertically aligned holes 10 and 11 and knock the dust from the walls of the bag-shaped filter elements 15. The thus-released dust drops into hoppers arranged in the lower part of the filtering chamber. Since the contaminated gases are introduced in the upper part of the filtering chamber, and downwardly-directed gas flows are thus generated between the cartridge filters, the conveyance of the dust released from the walls of the bag-shaped filter elements 15 to the hoppers is promoted.

I claim:

1. A device for mounting substantially vertical bag-shaped filter elements (15) in a filtering chamber in a filtering installation for cleaning contaminated gases which are conducted into said filtering chamber to be filtered by the bag-shaped filter elements and conducted, via the bag openings, to a chamber for clean gas which is located above and separate from said filtering chamber and from which the gases are discharged from the filtering installation, characterised by a substantially horizontal, lower tubular element (1) which forms a clean-gas chamber and has a series of first through holes (10) in its lower tube-wall portion (2b) and on which the bag-shaped filter elements (15) are mountable with the bag openings opposite to said first holes (10), and by a substantially horizontal, upper tubular element (4) which is closed at one end and which extends along said lower tubular element (1) and is connected thereto, and whose interior communicates with that of said lower tubular element (1) via a series of second holes (11), each of which is vertically aligned with one of said first holes (10), said upper tubular element (4) being adapted, at the other end, to be connected to a pressure source via a regulating valve for producing pressure pulses to clean said bag-shaped filter elements (15).

2. A device as claimed in claim 1, characterised in that the cross-sectional area of said upper tubular element (4) decreases in the direction of said one end.

3. A device as claimed in claim 1 characterised in that each of the second holes (11) is surrounded by a collar (12) extending down into said lower tubular element (1).

4. A device as claimed in claim 1, characterised in that the lower tubular element (1) has a substantially square cross-sectional shape.

5. A device as claimed in claim 2, characterized in that each of the second holes (11) is surrounded by a collar (12) extending down into said lower tubular element (1).

6. A device as claimed in claim 2, characterized in that the lower tubular element (1) has a substantially square cross-sectional shape.

7. A device as claimed in claim 3, characterized in that the lower tubular element (1) has a substantially square cross-sectional shape.

8. A device as claimed in claim 5, characterized in that the lower tubular element (1) has a substantially square cross-sectional shape.

* * * * *